(12) United States Patent
Demaratos

(10) Patent No.: US 11,339,823 B2
(45) Date of Patent: May 24, 2022

(54) SYSTEM AND METHOD FOR SEALING A METAL FASTENER FROM ELECTROLYTE IN AN AREA OF DISSIMILAR METALS

(71) Applicant: J.S.T. CORPORATION, Farmington Hills, MI (US)

(72) Inventor: David Demaratos, Wixom, MI (US)

(73) Assignee: J.S.T. CORPORATION, Farmington Hills, MI (US)

(*) Notice: Subject to any disclaimer, the term of this patent is extended or adjusted under 35 U.S.C. 154(b) by 707 days.

(21) Appl. No.: 16/383,624

(22) Filed: Apr. 14, 2019

(65) Prior Publication Data
US 2020/0049191 A1 Feb. 13, 2020

Related U.S. Application Data

(60) Provisional application No. 62/811,873, filed on Feb. 28, 2019, provisional application No. 62/716,487, filed on Aug. 9, 2018.

(51) Int. Cl.
| | |
|---|---|
| *F16B 35/06* | (2006.01) |
| *F16B 43/00* | (2006.01) |
| *F16B 33/00* | (2006.01) |
| *B60R 16/02* | (2006.01) |

(52) U.S. Cl.
CPC .......... *F16B 43/001* (2013.01); *F16B 33/008* (2013.01); *B60R 16/0215* (2013.01)

(58) Field of Classification Search
CPC .............................. F16B 43/001; F16B 33/008
USPC ...................................................... 411/408.1
See application file for complete search history.

(56) References Cited

U.S. PATENT DOCUMENTS

| | | | |
|---|---|---|---|
| 5,326,947 A | 7/1994 | Edds | |
| 5,531,614 A | 7/1996 | Gallusser | |
| 6,659,702 B2* | 12/2003 | Kitayama | F16B 43/001 |
| | | | 411/537 |
| 6,815,610 B2 | 11/2004 | Kuboshima | |
| 6,921,292 B2 | 7/2005 | Miyazaki | |
| 7,104,822 B2 | 9/2006 | Jazowski | |
| 7,347,478 B2* | 3/2008 | Kreft | B60N 2/015 |
| | | | 403/387 |
| 7,614,910 B2 | 11/2009 | Croteau | |
| 8,840,350 B2 | 9/2014 | Inaba | |
| 8,986,045 B2 | 3/2015 | Okamoto | |

(Continued)

OTHER PUBLICATIONS

Written Opinion of the International Searching Authority for International Application No. PCT/US2019/062861 dated Jan. 14, 2020 (8 sheets).

(Continued)

*Primary Examiner* — Gary W Estremsky
(74) *Attorney, Agent, or Firm* — Kratz, Quintos & Hanson, LLP

(57) ABSTRACT

A sealing system and a method for sealing a metal fastener and members having dissimilar metals for a header connector or a connector device from electrolyte in an area where, in the header connector or the connector device, certain dissimilar metals may be in contact. The metal fastener and other adjoining or abutting dissimilar metals are sealed by a non-conductive seal from electrolyte, thereby protecting the metal fastener and the other adjoining or abutting dissimilar metals from galvanic corrosion and subsequently protecting the integrity of the header connector or the connector device.

15 Claims, 2 Drawing Sheets

(56) References Cited

U.S. PATENT DOCUMENTS

| | | | |
|---|---|---|---|
| 8,992,249 B2 | 3/2015 | Kobayashi | |
| 9,040,846 B2 | 5/2015 | Suzuki | |
| 9,083,107 B2 * | 7/2015 | Suzuki | H01R 13/5219 |
| 9,337,577 B1 | 5/2016 | Hitchcock | |
| 9,716,374 B2 | 7/2017 | Rohr | |
| 9,746,021 B2 | 8/2017 | Kawashima | |
| 10,819,073 B2 * | 10/2020 | Azad | H01R 13/5202 |
| 2002/0048994 A1 | 4/2002 | Oota | |
| 2004/0057187 A1 | 3/2004 | Kuboshima | |
| 2004/0106325 A1 | 6/2004 | Miyazaki | |
| 2005/0215122 A1 | 9/2005 | Nishida | |
| 2007/0270037 A1 | 11/2007 | Deterre | |
| 2008/0310932 A1 * | 12/2008 | McIntyre | F16B 43/001 |
| | | | 411/150 |
| 2009/0181571 A1 | 7/2009 | Willing | |
| 2010/0189493 A1 * | 7/2010 | Aldstadt | F16B 43/001 |
| | | | 403/168 |
| 2010/0261364 A1 | 10/2010 | Matsuoka | |
| 2012/0021632 A1 | 1/2012 | Matsumoto | |
| 2012/0155988 A1 * | 6/2012 | Schumacher | F16B 31/02 |
| | | | 411/369 |
| 2012/0252272 A1 * | 10/2012 | Omae | H01R 13/506 |
| | | | 439/607.01 |
| 2013/0017719 A1 | 1/2013 | Tanaka | |
| 2013/0078872 A1 | 3/2013 | Tashiro | |
| 2014/0011401 A1 | 1/2014 | Endo | |
| 2014/0038459 A1 | 2/2014 | Kobayashi | |
| 2014/0127063 A1 | 5/2014 | Itsuki | |
| 2014/0287631 A1 | 9/2014 | Tashiro | |
| 2014/0370753 A1 | 12/2014 | Kobayashi | |
| 2015/0050826 A1 | 2/2015 | Tashiro | |
| 2015/0079859 A1 | 3/2015 | Glick | |
| 2015/0087190 A1 | 3/2015 | Schwan | |
| 2015/0219140 A1 | 8/2015 | Jenning | |
| 2015/0280381 A1 | 10/2015 | Rangi | |
| 2016/0134049 A1 | 5/2016 | Kataoka | |
| 2016/0172784 A1 | 6/2016 | Kataoka | |
| 2016/0233625 A1 | 8/2016 | Kato | |
| 2016/0305466 A1 * | 10/2016 | Kawashima | F16B 43/001 |
| 2016/0329651 A1 | 11/2016 | Yamaguchi | |
| 2017/0268547 A1 * | 9/2017 | Mori | F16B 43/00 |
| 2017/0338600 A1 | 11/2017 | Tanaka | |
| 2018/0094667 A1 * | 4/2018 | Clark | F16B 5/0258 |
| 2019/0006788 A1 * | 1/2019 | Cerfeuillet | H01R 4/5025 |
| 2019/0173221 A1 * | 6/2019 | de Chazal | H01R 13/631 |

OTHER PUBLICATIONS

International Search Report for International Application No. PCT/US2019/062861 dated Jan. 14, 2020 (3 sheets).

Office Action of U.S. Appl. No. 16/370,069 dated Apr. 4, 2020.

International Preliminary Reporton Patentability for International Application No. PCT/US2019/062861 dated Apr. 21, 2020 (12 sheets).

International Search Report for International Application No. PCT/US2019/042441 dated Oct. 7, 2019 (3 sheets).

Written Opinion of the International Searching Authority for International Application No. PCT/US2019/042441 dated Oct. 7, 2019 (4 sheets).

International Search Report for International Application No. PCT/US19/63068 dated Feb. 11, 2020 (4 sheets).

Written Opinion of the International Searching Authority for International Application No. PCT/US19/63068 dated Feb. 11, 2020 (9 sheets).

Office Action of U.S. Appl. No. 16/369,943 dated Jan. 22, 2020.

Office Action of U.S. Appl. No. 16/370,069 dated Dec. 3, 2019.

* cited by examiner

SYSTEM AND METHOD FOR SEALING A METAL FASTENER FROM ELECTROLYTE IN AN AREA OF DISSIMILAR METALS

CROSS-REFERENCE TO RELATED APPLICATIONS

This patent application claims priority to U.S. Provisional Patent Application No. 62/716,487 filed Aug. 9, 2018 and U.S. Provisional Patent Application No. 62/811,873 filed Feb. 28, 2019, which are hereby incorporated herein by reference in their entireties.

BACKGROUND OF THE INVENTION

In the automotive wire harness industry, a typical header or device connector includes a seal for sealing against liquid (e.g., water) from leaking into an area housing wires and terminals. However, in the automotive wire harness industry, when dissimilar metals are used, galvanic corrosion occurs in the presence of an electrolyte.

More particularly, dissimilar metals or alloys have different electrode potentials, and therefore when two or more dissimilar metals come into contact in an electrolyte, one acts as an anode and the other acts as a cathode. The presence of an electrolyte, which provides an electrical conducting path between dissimilar metals, causes galvanic corrosion to occur. As shown in FIG. 1, a contact area A1 located inside an area protected by a seal 10 is sealed from, for example, electrolyte and thus a, e.g., connector housing flange 15 made of a first type of metal and a, for example, housing or fixture 20 made of a second type of metal abutting and contacting or connected to each other is not subject to galvanic corrosion despite the first and second types of metal being dissimilar. However, a contact area A2 located outside the area protected by the seal 10 is subject to the entry of and unprotected from electrolyte, and is thus subject to galvanic corrosion. Also, the fastener or bolt 25 made of metal that is dissimilar from the type of metal that makes up the connector housing flange 15 includes a contact area A3 that is not protected from electrolyte and is thus subject to galvanic corrosion.

The fastener or bolt 25 includes a head 26; and a portion 27 below or beneath the head 26 is a washer 28 provided between the portion 27 below or beneath the head 26 and the housing or fixture 20.

If the washer 28 is made of a type of metal that is dissimilar from the type of metal that makes up the fastener or bolt head 26, the presence of electrolyte between the washer 28 and the fastener or bolt head 26 causes galvanic corrosion. Similarly, if the washer 28 is made of a type of metal that is dissimilar from the type of metal that makes up the housing or fixture 20, the presence of electrolyte between the washer 28 and the housing or fixture 20 causes galvanic corrosion.

The invention solves the problems inherent in the above-described typical header or device connector. This invention seals the fastener or bolt below the e.g., bolt head (where the bolt 25 contacts dissimilar metals) from electrolyte (e.g., salt water or the like), thereby protecting the header or device connector from galvanic corrosion.

SUMMARY OF THE INVENTION

This invention is directed to a sealing system and a method for sealing a metal fastener (e.g., a bolt or the like) and members having dissimilar metals for a header connector or a connector device from electrolyte (e.g., salt water or the like) in an area where, in the header connector or the connector device, certain dissimilar metals may be in contact. In this invention, the metal fastener (e.g., below a bolt head or the like) and other adjoining or abutting dissimilar metals are sealed by a non-conductive seal (preferably, a non-conductive silicone seal) of this invention from electrolyte, thereby protecting the metal fastener and the other adjoining or abutting dissimilar metals from galvanic corrosion and subsequently protecting the integrity of the header connector or the connector device.

DETAILED DESCRIPTION OF THE PREFERRED EMBODIMENTS

Figure 1:
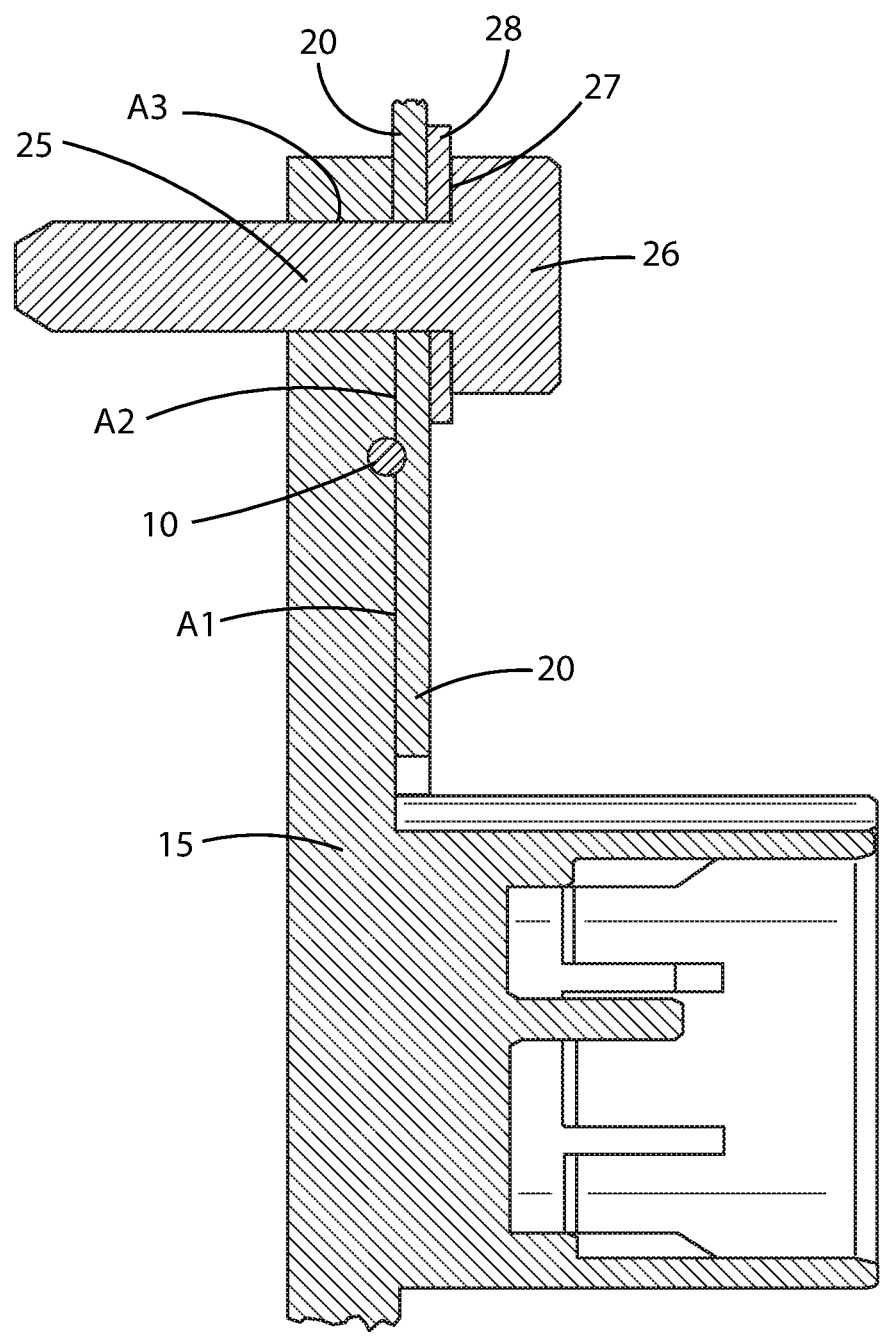
FIG. 1 is a cross-sectional elevational view of a known header or device connector in the automotive wire harness industry.
Figure 2:
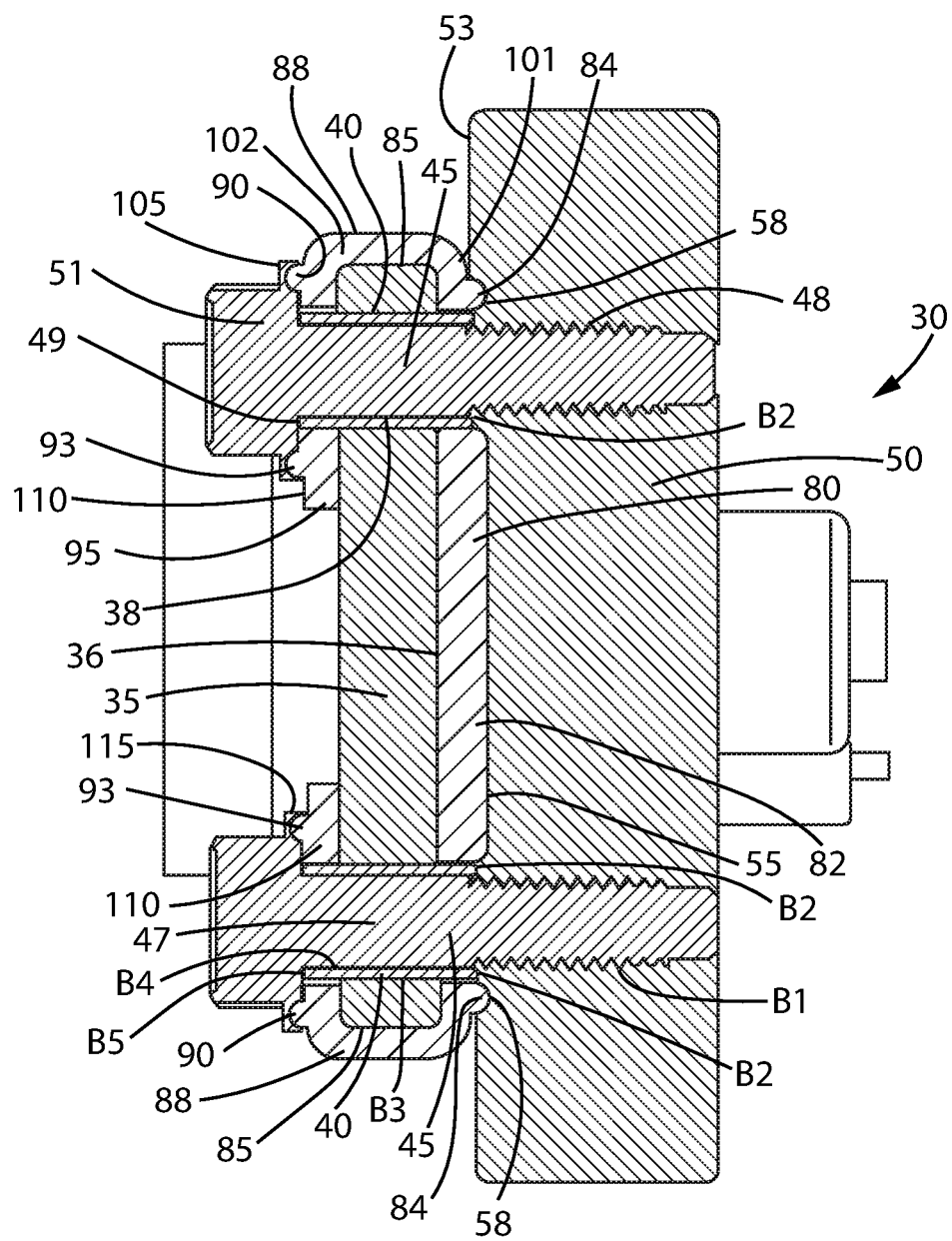
FIG. 2 is a cross-sectional elevational view of an embodiment of a header or device connector of this invention showing a seal that protects fasteners, and abutting or adjoining members from electrolyte in areas of dissimilar metals.

As illustrated in FIG. 2, a header or device connector 30 of this invention includes a member (e.g., a housing, a connector housing flange or the like) 35 having at least an aperture 38 passing therethrough. The member 35 may be made of a first type of metal or a stainless steel fiber-filled plastic or resin (e.g., EMI resin). Each aperture 38 accommodates therein a limiter 40, which may be made of a second type of metal, wherein the first type of metal of the member 35 may be a dissimilar type of metal from the second type of metal of the limiter 40. Passing through each limiter 40 is a fastener (e.g., a bolt or the like) 45. The fastener 45 is made of a third type of metal. The fastener 45 is preferably threaded to connect the member 35 having the first type of metal to a member (e.g., a metal housing or fixture, or the like) 50 having a fourth type of metal.

The first type of metal of the member 35, the second type of metal of the limiter 40, the third type of metal of the fastener 45, and the fourth type of metal of the member 50 may be made of any combination of dissimilar metals or may all be types of metal that are dissimilar from each other.

As further illustrated in FIG. 2, the member 50 made of the fourth type of metal has a side 53 that includes at least an indentation 55. Although the indentation 55 of the member 50 is shown in FIG. 2 as an elongated indentation, the indentation 55 may take any form (e.g., a plurality of elongated indentations, a single or multiple circular indentations, or the like) as long as the indentation 55 provides the necessary sealing between the side 53 of the member 50 and a side 36 of the adjoining member 35 having the first type of metal.

Presuming that the first type of metal of the member 35, the second type of metal of the limiter 40, the third type of metal of the fastener 45, and the fourth type of metal of the member 50 are all dissimilar from each other, galvanic corrosion can occur in area B1 between threads 48 of the fastener 45 and the member 50, an area B2 between the limiter 40 and the member 50, an area B3 between the limiter 40 and the member 35, an area B4 between a body 47 of the fastener 45 and the limiter 40, and an area B5 between the limiter 40 and a portion 49 below or beneath a head 51 of the fastener 45 with the presence of electrolyte therebetween. Galvanic corrosion due to electrolyte is prevented in the above-described areas B1, B2, B3, B4, and B5 with the employment of a seal 80 of this invention, as illustrated in FIG. 2 and as described in detail hereinafter.

The seal 80 of this invention is made of a non-conductive silicone, and includes a portion 82, which may be a single or a plurality of substantially flat portions located between the indentation (or a plurality of indentations) 55 of the member 50 and the member 35. The seal 80 further includes, on opposing sides of the portion 82, at least a pad 84 that respectively sits into a corresponding groove 58 on opposing sides of the member 50. Covering each end 85 of the member 35 is a side cover portion 88 of the seal 80. The side cover portion 88 of the seal 80 is substantially C-shaped having ends 101, 102, the end 101 having at least a lower pad 84 of the seal 80, and the end 102 having at least an upper pad 90. The lower pad 84 and the upper pad 90 of the seal 80 are substantially opposite each other. The pad 90 of the seal 80 preferably sits inside a groove 105 located in the portion 49 below or beneath the head 51 of the fastener 45.

The seal 80 further includes an extended portion 110, which includes an inner pad 93 that sits inside a groove 115 also located in the portion 49 below or beneath the head 51 of the fastener 45. Both the end 102 and the extended portion 110 of the seal 80 are located between the portion 49 below or beneath the head 51 of the fastener 45 and the member 35.

As discussed above, the areas B1, B2, B3, B4, and B5 are vulnerable to the presence of electrolyte in the absence of the seal 80 of this invention; and thus, presuming the first type of metal (of the member 35), the second type of metal (of the limiter 40), the third type of metal (of the fastener 45), and the fourth type of metal (of the member 50) are all different from each other, the member 35, the limiter 40, the fastener 45, and the member 50 becomes susceptible to galvanic corrosion in the absence of the seal 80 of this invention.

The seal 80 of this invention protects the member 35, the limiter 40, the fastener 45, and the member 50 from galvanic corrosion by having the seal 80 of this invention prevent invasion of electrolyte into the above-discussed areas B1, B2, B3, B4, and B5.

More particularly, each area B1 (between the threads 48 of the fastener 45 and the member 50) is protected by at least one of the portion 82 of the seal 80 and a corresponding one of the pads 84 of the seal 80. Each area B2 (between the limiter 40 and the member 50) is protected by at least one of a corresponding one of the pads 84 of the seal 80, a corresponding one of the extended portions 110 of the seal 80, and a corresponding one of the pads 93 of the seal 80. Each area B3 (between the limiter 40 and the member 35) is protected by at least one of a corresponding one of the side cover portions 88 of the seal 80, a corresponding one of the pads 84, 90 of the seal 80, a corresponding one of the extended portions 110 of the seal 80, and a corresponding one of the pads 93 of the seal 80. Each area B4 (between the body 47 of the fastener 45 and the limiter 40) is also protected by at least one of a corresponding one of the side cover portions 88 of the seal 80, a corresponding one of the pads 84, 90 of the seal 80, a corresponding one of the extended portions 110 of the seal 80, and a corresponding one of the pads 93 of the seal 80. Each area B5 (between the limiter 40 and the portion 49 below or beneath the head 51 of the fastener 45) is protected by at least one of a corresponding one of the pads 90 of the seal 80, a corresponding one of the extended portions 110 of the seal 80, and a corresponding one of the pads 93 of the seal 80.

A method for sealing the metal fastener 45 from electrolyte in an area of dissimilar metals is hereinafter described.

Each of the side cover portions 88 of the seal 80 wraps around and covers the respective end 85 of the member 35. The seal 80 is a non-conductive silicone seal or the like. The seal 80 has passing therethrough apertures for respectively accommodating therein the limiters 40. The member 35 with the seal 80 mounted or wrapped around thereof is then placed abutting the member 50 with the portion 82 of the seal 40 seated within the indentation 55 of the member 50. Each fastener 45 is inserted into a respective one of the limiters 40, and the threads 48 of each of the fasteners 45 are fastened into the member 50.

Thereupon, each of the lower pads 84 of the seal 40 is respectively seated into a corresponding one of the grooves 58 of the member 50; each of the pads 90 of the seal 80 is respectively seated into a corresponding one of the grooves 105 located in the portion 49 below or beneath the head 51 of the fastener 45; and similarly, each of the pads 93 of the seal 80 is respectively seated into a corresponding one of the grooves 115 located in the portion 49 below or beneath the head 51 of the fastener 45.

The present invention is not limited to the above-described embodiments; and various modifications in design, structural arrangement or the like may be used without departing from the scope or equivalents of the present invention.

I claim:

1. A system for sealing a metal fastener from electrolyte in an area of dissimilar metals, comprising a seal, wherein said seal comprises:
    a least a substantially flat portion that is seated between a first member and a second member, and
    end portions, each of said end portions being substantially C-shaped and being respectively mounted onto an end portion of said first member, wherein each substantially C-shaped end portion of said seal has a lower end portion and an upper end portion, each lower end portion having at least a lower pad and each upper end portion having at least an upper pad,
    an extended portion extending from said upper end portion and having at least an inner pad, and
    side portions having apertures passing therethrough for respectively receiving therein metal fasteners,
    wherein each lower pad is seated into a corresponding first groove of said second member,
    wherein said upper pad is seated into a corresponding second groove below or beneath a head of a corresponding one of said fasteners, and
    wherein said inner pad is seated into a corresponding third groove below or beneath said head of a corresponding one of said fasteners.

2. The system for sealing a metal fastener from electrolyte in an area of dissimilar metals according to claim 1, further comprising at least a limiter accommodated within a corresponding one of said apertures and abutting with a corresponding one of said fasteners.

3. The system for sealing a metal fastener from electrolyte in an area of dissimilar metals according to claim 1, wherein said first member is one of a housing and a connector housing flange.

4. The system for sealing a metal fastener from electrolyte in an area of dissimilar metals according to claim 2, wherein said second member is one of a housing and a fixture.

5. The system for sealing a metal fastener from electrolyte in an area of dissimilar metals according to claim 2, wherein at least one of said substantially flat portion and a corresponding one of said lower pads of said seal protect from said electrolyte a first area between said threads of said fastener and said second member.

6. The system for sealing a metal fastener from electrolyte in an area of dissimilar metals according to claim 5, wherein at least one of a corresponding one of said lower pads, a corresponding one of said extended portions, and a corresponding one of said inner pads of said seal protect from said electrolyte a second area between a corresponding one of said limiters and said second member.

7. The system for sealing a metal fastener from electrolyte in an area of dissimilar metals according to claim 6, wherein at least one of a corresponding one of said substantially C-shaped end portions, a corresponding one of said lower and upper pads, a corresponding one of said extended portions, and a corresponding one of said inner pads of said seal protect from said electrolyte a third area between a corresponding one of said limiters and said first member.

8. The system for sealing a metal fastener from electrolyte in an area of dissimilar metals according to claim 7, wherein at least one of a corresponding one of said substantially C-shaped end portions, a corresponding one of said lower and upper pads, a corresponding one of said extended portions, and a corresponding one of said inner pads of said seal protect from said electrolyte a fourth area between a corresponding one of said fasteners and a corresponding one of said limiters.

9. The system for sealing a metal fastener from electrolyte in an area of dissimilar metals according to claim 8, wherein at least one of a corresponding one of said upper pads, a corresponding one of said extended portions, and a corresponding one of said inner pads of said seal protect from said electrolyte a fifth area between a corresponding one of said limiters and a corresponding one of a portion below or beneath a head of one of said fasteners.

10. A method for sealing a metal fastener from electrolyte in an area of dissimilar metals, comprising the steps of:
    mounting a seal onto a first member;
    placing said first member, with said seal mounted thereon, onto a second member so as to abut thereto;
    inserting fasteners into apertures passing through said seal and said first member;
    fastening threads of said fasteners into said second member;
    respectively covering with cover side portions of said seal ends of said first member;
    inserting corresponding one of lower pads of said seal into a corresponding one of grooves of said second member;
    inserting a corresponding one of upper pads of said seal into a corresponding one of first grooves below or beneath a portion of a head of a corresponding one of said fasteners; and
    inserting a corresponding one of inner pads of said seal into a corresponding one of second grooves below or beneath another portion of said head of a corresponding one of said fasteners.

11. The method for sealing a metal fastener from electrolyte in an area of dissimilar metals according to claim 10, further comprising the step of protecting the occurrence of galvanic corrosion by preventing entry of said electrolyte in a first area between said thread of said fasteners and said second member.

12. The method for sealing a metal fastener from electrolyte in an area of dissimilar metals according to claim 11, further comprising the step of protecting the occurrence of galvanic corrosion by preventing entry of said electrolyte in a second area between said limiters and said second member.

13. The method for sealing a metal fastener from electrolyte in an area of dissimilar metals according to claim 12, further comprising the step of protecting the occurrence of galvanic corrosion by preventing entry of said electrolyte in a third area between said limiters and said first member.

14. The method for sealing a metal fastener from electrolyte in an area of dissimilar metals according to claim 13, further comprising the step of protecting the occurrence of galvanic corrosion by preventing entry of said electrolyte in a fourth area between said fasteners and said limiters.

15. The method for sealing a metal fastener from electrolyte in an area of dissimilar metals according to claim 14, further comprising the step of protecting the occurrence of galvanic corrosion by preventing entry of said electrolyte in a fifth area between said limiters and portions below or beneath heads of said fasteners.

* * * * *